(12) United States Patent
Lin

(10) Patent No.: US 9,706,034 B2
(45) Date of Patent: Jul. 11, 2017

(54) TERMINAL AND IMAGE FILE PROCESSING METHOD

(71) Applicants: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

(72) Inventor: Huajian Lin, Guangdong (CN)

(73) Assignees: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

( * ) Notice: Subject to any disclaimer, the term of this patent is extended or adjusted under 35 U.S.C. 154(b) by 54 days.

(21) Appl. No.: 14/895,536

(22) PCT Filed: Jun. 3, 2013

(86) PCT No.: PCT/CN2013/076635
§ 371 (c)(1),
(2) Date: Dec. 3, 2015

(87) PCT Pub. No.: WO2014/194456
PCT Pub. Date: Dec. 11, 2014

(65) Prior Publication Data
US 2016/0134739 A1    May 12, 2016

(51) Int. Cl.
*H04M 1/725* (2006.01)
*G06F 17/30* (2006.01)

(52) U.S. Cl.
CPC ... *H04M 1/72519* (2013.01); *G06F 17/30115* (2013.01); *G06F 17/30165* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2012/0281129 A1* | 11/2012 | Wang | H04N 5/23219 348/333.01 |
| 2014/0184854 A1* | 7/2014 | Musatenko | H04N 5/23296 348/240.2 |
| 2016/0057339 A1* | 2/2016 | Raffle | G06K 9/00281 348/222.1 |

FOREIGN PATENT DOCUMENTS

| | | |
|---|---|---|
| CN | 102368746 A | 3/2012 |
| CN | 102801857 A | 11/2012 |

(Continued)

OTHER PUBLICATIONS

International Search Report dated Mar. 6, 2014 received from International Application No. PCT/CN2013/076635.

*Primary Examiner* — Delomia L Gilliard
(74) *Attorney, Agent, or Firm* — Scully, Scott, Murphy & Presser, P.C.

(57) ABSTRACT

The present invention provides a terminal which includes an image acquisition unit configured to start a second image acquisition device to acquire a characteristic image of at least one photographer when it is detected that the terminal uses a first image acquisition device to acquire an image, an information acquisition unit configured to recognize and process the characteristic image acquired by the second acquisition device so as to acquire a recognition information list, and a processing unit configured to execute a preset operation on the image file acquired by the first image acquisition device according to the recognition information list. Accordingly, the present invention further provides an image file processing method. By means of the technical (Continued)

solution of the present invention, automatic image processing can be realized to avoid complicated manual operation.

20 Claims, 4 Drawing Sheets

(56) References Cited

FOREIGN PATENT DOCUMENTS

| | | | |
|---|---|---|---|
| CN | 103037077 A | | 4/2013 |
| CN | 103037077 B | * | 7/2015 |
| WO | WO 2006/121203 A1 | | 11/2006 |

* cited by examiner

TERMINAL AND IMAGE FILE PROCESSING METHOD

FIELD OF THE TECHNICAL

The present disclosure relates to mobile technology field, and particularly to a terminal and an image file processing method.

BACKGROUND

Presently, users often adopt manual operation to process image files, video files, and so on. For example, if a user wants to share an image/video file, the user needs to select contacts with who the user wants to share the image/video file one by one. By doing so, the image/video file can be shared to others, but the user's operation is complicated and not intelligent.

Therefore, a new technical solution is needed to avoid complicated manual operation for processing image files, and accordingly automatic process for image files can be realized.

SUMMARY

Based on the problems set forth above, the present invention provides a new technical solution to avoid complicated manual operation for processing image files, and accordingly automatic process for image files can be realized.

The present invention provides a terminal includes an image acquisition unit configured to start a second image acquisition device to acquire a characteristic image of at least one photographer when it is detected that the terminal uses a first image acquisition device to acquire an image, an information acquisition unit configured to recognize and process the characteristic image acquired by the second acquisition device so as to acquire a recognition information list, and a processing unit configured to execute a preset operation on the image file acquired by the first image acquisition device according to the recognition information list.

In the technical solution, the preset operation includes sharing an image file, saving as a new image file, encrypting an image file, and so on. Wherein, the first image acquisition device and the second image acquisition device can be arranged on different sides of the terminal. The first image acquisition device includes a rear camera, and the second image acquisition device includes a front-facing camera. By means of the technical solution, when a user uses one image acquisition device to capture an image, another image acquisition device is automatically started to acquire a characteristic image of the photographer, so as to automatically share the acquired image file, save the acquired image file as a new image file, and encrypt the acquired image file according to the information list of the recognized photographer, thus complicated manual operation can be avoided, and usage experience of the user can be improved.

In the technical solution, preferably, the characteristic image includes a face image.

In the technical solution, preferably, the information acquisition unit includes a recognition sub-unit configured to compare the acquired face image of the at least one photographer with pre-stored contact head images, so as to recognize at least one photographer and obtain a pre-stored contact information list corresponding to the at least one photographer. The processing unit is further configured to execute the preset operation on the image file according to the contact information list.

In the technical solution, by means of executing a recognition operation on the face image acquired by the second image acquisition device, the specific contact corresponding to the face image can be determined. By doing so, the preset operation can be exerted on the image acquired by the first image acquisition device according to the recognized contact information list. For example, the image file is shared to other recognized photographers. For example, when the user A, the user B, and the user C stand together to use a mobile phone to shoot a landscape, the front-facing camera is also started to capture the face images of the user A, the user B, and the user C when the rear camera is used by the terminal to shoot the landscape. The terminal further executes a recognition operation on the captured face images to acquire the contact information list recording contact information of the user A, the user B, and the user C. According to the specific contact information, the terminal executes the preset operation on the captured landscape image, for example, automatically shares the landscape image to the user A, the user B, and the user C.

In the technical solution, preferably, the terminal further includes a selecting unit configured to select a portion of contacts from a plurality of contacts in the contact information list according to a received selection command. The processing unit is further configured to execute the preset operation on the image file according to the information list recording contact information of the portion of contacts.

In the technical solution, the contact information list recognized by the terminal may include a plurality of contacts, and the user can select a portion of contacts from the plurality of contacts to perform an operation. For example, if the terminal recognizes that there are a plurality of contacts, and the user does not want to share the captured image with all the recognized contacts, at this point to share the captured image, the user can select a portion of contacts with who the user wants to share the captured image from all the recognized contacts and share the captured image with the portion of contacts, thereby providing a convenient operation condition for the user and improving usage experience of the user.

In the technical solution, preferably, the terminal further includes a setting unit configured to set contact head images and contact information according to a received setting command, and a storing unit configured to store the contact head images and the contact information.

In the technical solution, the user can randomly set and select to save the contact head images and the contact information. By doing so, when the terminal executes a recognition operation on the acquired face image, the terminal recognizes the corresponding contact according to the contact head image set by the user, and further finishes the preset operation according to the corresponding contact information. Wherein, the contact information can include a variety of contact information, e.g., a micro blog account, a QQ account. When some contact has a variety of contact information, the terminal can select appropriate contact information from the variety of contact information according to a preset contact information selection rule to execute the preset operation.

In the technical solution, preferably, the terminal further includes a prompting unit configured to prompt the user to make a selection on whether or not a preset operation will be exerted on the image file when the information acquisition unit acquires the recognition information list, and further configured to receive user's selection. The processing unit is further configured to execute the preset operation on the image file when the selection received by the prompting unit is yes.

In the technical solution, before executing the preset operation, the terminal prompts the user to make a selection on whether or not the preset operation will be executed, and executes the corresponding operation according to user's selection. By doing so, the user can make a selection according to user's need. For example, after finishing photographing, the user is provided with a prompt for whether or not to select to share the captured image with the recognized photographers.

In the above-described technical solution, preferably, the terminal further includes a function starting unit configured to start an image file operation function according to a received function starting command, to cause the image acquisition unit to start the second image acquisition device to acquire the characteristic image when it is detected that the terminal uses the first image acquisition device to acquire an image.

In the technical solution, the user can select whether or not to start the image file processing function according to user's need. By doing so, when the user needs, the user is provided with an image automatic processing function, and when the user does not need, the image file processing function is disabled, which can eliminate unnecessary operation of the terminal and provide the user with excellent usage experience.

According to another aspect of the present invention, an image file processing method is provided. The method includes: step 202, starting a second image acquisition device to acquire a characteristic image of at least one photographer when it is detected that the terminal uses a first image acquisition device to acquire an image; step 204, recognizing and processing the characteristic image acquired by the second acquisition device so as to acquire a recognition information list; step 206, executing a preset operation on the image file acquired by the first image acquisition device according to the recognition information list.

In the technical solution, the preset operation includes sharing an image file, saving as a new image file, encrypting an image file, and so on. Wherein, the first image acquisition device and the second image acquisition device can be arranged on different sides of the terminal. The first image acquisition device includes a rear camera, and the second image acquisition device includes a front-facing camera. By means of the technical solution, when a user uses one image acquisition device to capture an image, another image acquisition device is automatically started to acquire a characteristic image of the photographer, so as to automatically share the acquired image file, save the acquired image file as a new image file, and encrypt the acquired image file according to the information list of the recognized photographer, thus complicated manual operation can be avoided, and usage experience of the user can be improved.

In the technical solution, preferably, the characteristic image includes a face image.

In the technical solution, preferably, step 204 further includes comparing the acquired face image of the at least one photographer with pre-stored contact head images so as to recognize at least one photographer and obtain a pre-stored contact information list corresponding to the at least one photographer. Step 206 further includes executing the preset operation on the image file according to the contact information list.

In the technical solution, by means of executing a recognition operation on the face image acquired by the second image acquisition device, the specific contact corresponding to the face image can be determined. By doing so, the preset operation can be exerted on the image acquired by the first image acquisition device according to the recognized contact information list. For example, the image file is shared to other recognized photographers. For example, when the user A, the user B, and the user C stand together to use a mobile phone to shoot a landscape, the front-facing camera is also started to capture the face images of the user A, the user B, and the user C when the rear camera is used by the terminal to shoot the landscape. The terminal further executes a recognition operation on the captured face images to obtain the contact information list recording contact information of the user A, the user B, and the user C. According to the specific contact information, the terminal executes the preset operation on the captured landscape image, for example, automatically shares the landscape image to the user A, the user B, and the user C.

In the technical solution, preferably, step 204 further includes selecting a portion of contacts from a plurality of contacts in the contact information list according to a received selection command. Step 206 further includes executing the preset operation on the image file according to the information list recording contact information of the portion of contacts.

In the technical solution, the contact information list recognized by the terminal may include a plurality of contacts, and the user can select a portion of contacts from the plurality of contacts to perform an operation. For example, if the terminal recognizes that there are a plurality of contacts, and the user does not want to share the captured image with all the recognized contacts, at this point to share the captured image, the user can select a portion of contacts with who the user wants to share the captured image from all the recognized contacts and share the captured image with the portion of contacts, thereby providing a convenient operation condition for the user and improving usage experience of the user.

In the technical solution, preferably, before step 204, the method further includes setting contact head images and contact information according to a received setting command, and storing the contact head images and the contact information.

In the technical solution, the user can randomly set and select to save the contact head images and the contact information. By doing so, when the terminal executes a recognition operation on the acquired face image, the terminal recognizes the corresponding contact according to the contact head image set by the user, and further finishes the preset operation according to the corresponding contact information. Wherein, the contact information can include a variety of contact information, e.g., a micro blog account, a QQ account. When some contact has a variety of contact information, the terminal can select appropriate contact information from the variety of contact information according to a preset contact information selection rule to execute a preset operation.

In the technical solution, preferably, before step 206, the method further includes prompting the user to make a selection on whether or not a preset operation will be exerted on the image file when the recognition information list is acquired, and further includes receiving user's selection. Step 206 further includes executing the preset operation on the image file when the received selection is yes.

In the technical solution, before executing the preset operation, the terminal prompts the user to make a selection on whether or not the preset operation will be executed, and executes the corresponding operation according to user's selection. By doing so, the user can make a selection according to user's need. For example, after finishing photographing, the user is provided with a prompt for whether or not to select to share the captured image with the recognized photographers.

In the above-described technical solution, preferably, before step 202, the method further includes starting an image file operation function according to a received function starting command, to start the second image acquisition device to acquire the characteristic image when it is detected that the terminal uses the first image acquisition device to acquire an image.

In the technical solution, the user can select whether or not to start the image file processing function according to user's need. By doing so, when the user needs, the user is provided with an image automatic processing function, and when the user does not need, the image file processing function is disabled, which can eliminate unnecessary operation of the terminal and provide the user with excellent usage experience.

By means of the technical solution of the present invention, the photographers can be recognized. Therefore, when the terminal is used to capture an image, the terminal can execute a preset operation on the captured image according to the contact information list recording contact information of the photographers. For example, if a plurality of photographers use the terminal to capture an image, after finishing capturing, by means of the technical solution of the present invention, the captured image can be automatically shared to the plurality of photographers, and the user does not need to select contacts one by one, thereby avoiding complicated operation and facilitating the user to use the terminal.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
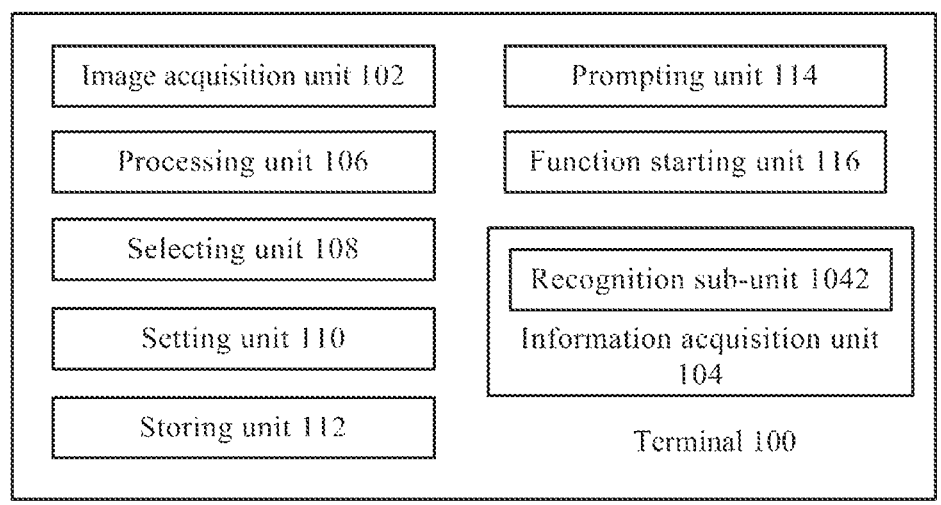
FIG. 1 shows a block diagram of a terminal in accordance with an exemplary embodiment of the present invention.

FIG. 1 shows a block diagram of a terminal in accordance with an exemplary embodiment of the present invention.

As shown in FIG. 1, a terminal 100 in accordance with an embodiment of the present invention includes an image acquisition unit 102 configured to start a second image acquisition device to acquire a characteristic image of at least one photographer when it is detected that the terminal uses a first image acquisition device to acquire an image, an information acquisition unit 104 configured to recognize and process the characteristic image acquired by the second acquisition device so as to acquire a recognition information list, and a processing unit 106 configured to execute a preset operation on the image file acquired by the first image acquisition device according to the recognition information list.

In the technical solution, the preset operation includes sharing an image file, saving as a new image file, encrypting an image file, and so on. Wherein, the first image acquisition device and the second image acquisition device can be arranged on different sides of the terminal. The first image acquisition device includes a rear camera, and the second image acquisition device includes a front-facing camera. By means of the technical solution, when a user uses one image acquisition device to capture an image, another image acquisition device is automatically started to acquire a characteristic image of the photographer, so as to automatically share the acquired image file, save the acquired image file as a new image file, and encrypt the acquired image file according to the information list of the recognized photographer, thus complicated manual operation can be avoided, and usage experience of the user can be improved.

In the technical solution, preferably, the characteristic image includes a face image.

In the technical solution, preferably, the information acquisition unit 104 includes a recognition sub-unit 1042 configured to compare the acquired face image of the at least one photographer with pre-stored contact head images, so as to recognize at least one photographer and obtain a pre-stored contact information list corresponding to the at least one photographer. The processing unit 106 is further configured to execute the preset operation on the image file according to the contact information list.

In the technical solution, by means of executing a recognition operation on the face image acquired by the second image acquisition device, the specific contact corresponding to the face image can be determined. By doing so, the preset operation can be exerted on the image acquired by the first image acquisition device according to the recognized contact information list. For example, the image file is shared to other recognized photographers. For example, when the user A, the user B, and the user C stand together to use a mobile phone to shoot a landscape, the front-facing camera is also started to capture the face images of the user A, the user B, and the user C when the rear camera is used by the terminal to shoot the landscape. The terminal further executes a recognition operation on the captured face images to acquire the contact information list recording contact information of the user A, the user B, and the user C. According to the specific contact information, the terminal executes the preset operation on the captured landscape image, for example, automatically shares the landscape image to the user A, the user B, and the user C.

In the technical solution, preferably, the terminal further includes a selecting unit 108 configured to select a portion of contacts from a plurality of contacts in the contact information list according to a received selection command. The processing unit 106 is further configured to execute the preset operation on the image file according to the information list recording contact information of the portion of contacts.

In the technical solution, the contact information list recognized by the terminal may include a plurality of contacts, and the user can select a portion of contacts from the plurality of contacts to perform an operation. For example, if the terminal recognizes that there are a plurality of contacts, and the user does not want to share the captured image with all the recognized contacts, at this point to share the captured image, the user can select a portion of contacts with who the user wants to share the captured image from all the recognized contacts and share the captured image with the portion of contacts, thereby providing a convenient operation condition for the user and improving usage experience of the user.

In the technical solution, preferably, the terminal further includes a setting unit 110 configured to set contact head images and contact information according to a received setting command, and a storing unit 112 configured to store the contact head images and the contact information.

In the technical solution, the user can randomly set and select to save the contact head images and the contact information. By doing so, when the terminal executes a recognition operation on the acquired face image, the terminal recognizes the corresponding contact according to the contact head image set by the user, and further finishes the preset operation according to the corresponding contact information. Wherein, the contact information can include a variety of contact information, e.g., a micro blog account, a QQ account. When some contact has a variety of contact information, the terminal can select appropriate contact information from the variety of contact information according to a preset contact information selection rule to execute the preset operation.

In the technical solution, preferably, the terminal further includes a prompting unit 114 configured to prompt the user to make a selection on whether or not a preset operation will be exerted on the image file when the information acquisition unit 104 acquires the recognition information list, and further configured to receive user's selection. The processing unit 106 is further configured to execute the preset operation on the image file when the selection received by the prompting unit 114 is yes.

In the technical solution, before executing the preset operation, the terminal prompts the user to make a selection on whether or not the preset operation will be executed, and executes the corresponding operation according to user's selection. By doing so, the user can make a selection according to user's need. For example, after finishing photographing, the user is provided with a prompt for whether or not to select to share the captured image with the recognized photographers.

In the above-described technical solution, preferably, the terminal further includes a function starting unit 116 configured to start an image file operation function according to a received function starting command, to cause the image acquisition unit 102 to start the second image acquisition device to acquire the characteristic image when it is detected that the terminal uses the first image acquisition device to acquire an image.

In the technical solution, the user can select whether or not to start the image file processing function according to user's need. By doing so, when the user needs, the user is provided with an image automatic processing function, and when the user does not need, the image file processing function is disabled, which can eliminate unnecessary operation of the terminal and provide the user with excellent usage experience.

Figure 2:
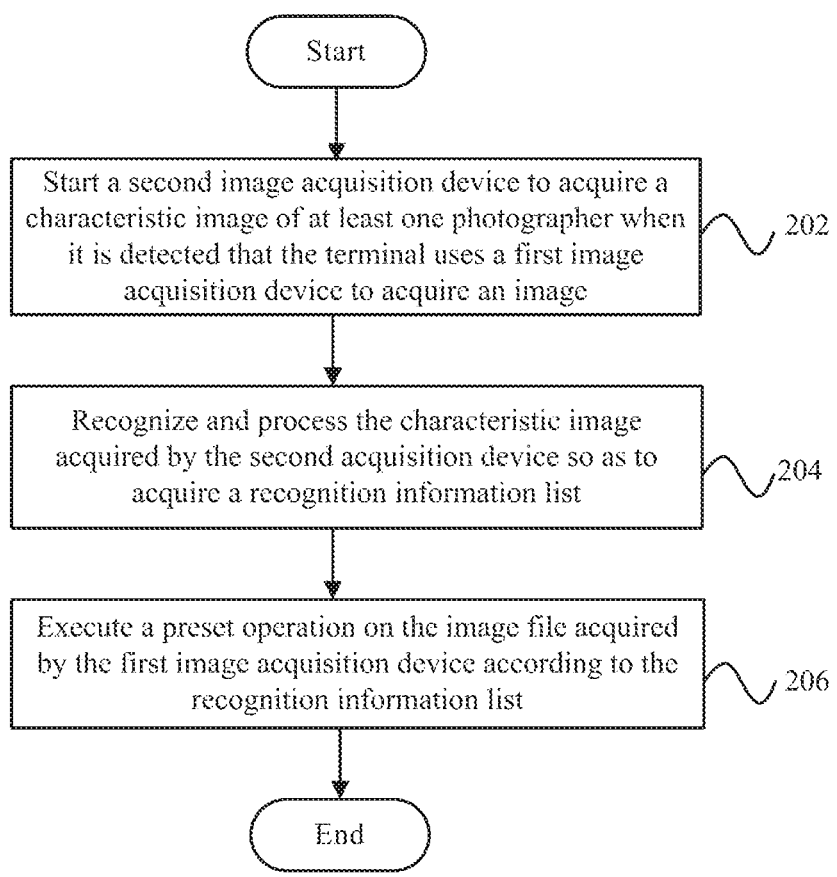
FIG. 2 is a flow chart of an image processing method in accordance with an exemplary embodiment of the present invention.

FIG. 2 shows a flow chart of an image file processing method in accordance with an exemplary embodiment of the present invention.

As shown in FIG. 2, an image file processing method in accordance with an exemplary embodiment of the present invention includes: step 202, starting a second image acquisition device to acquire a characteristic image of at least one photographer when it is detected that the terminal uses a first image acquisition device to acquire an image; step 204, recognizing and processing the characteristic image acquired by the second acquisition device so as to acquire a recognition information list; step 206, executing a preset operation on the image file acquired by the first image acquisition device according to the recognition information list.

In the technical solution, the preset operation includes sharing an image file, saving as a new image file, encrypting an image file, and so on. Wherein, the first image acquisition device and the second image acquisition device can be arranged on different sides of the terminal. The first image acquisition device includes a rear camera, and the second image acquisition device includes a front-facing camera. By means of the technical solution, when a user uses one image acquisition device to capture an image, another image acquisition device is automatically started to acquire a characteristic image of the photographer, so as to automatically share the acquired image file, save the acquired image file as a new image file, and encrypt the acquired image file according to the information list of the recognized photographer, thus complicated manual operation can be avoided, and usage experience of the user can be improved.

In the technical solution, preferably, the characteristic image includes a face image.

In the technical solution, preferably, step 204 further includes comparing the acquired face image of the at least one photographer with pre-stored contact head images so as to recognize at least one photographer and obtain a pre-stored contact information list corresponding to the at least one photographer. Step 206 further includes executing the preset operation on the image file according to the contact information list.

In the technical solution, by means of executing a recognition operation on the face image acquired by the second image acquisition device, the specific contact corresponding to the face image can be determined. By doing so, the preset operation can be exerted on the image acquired by the first image acquisition device according to the recognized contact information list. For example, the image file is shared to other recognized photographers. For example, when the user A, the user B, and the user C stand together to use a mobile phone to shoot a landscape, the front-facing camera is also started to capture the face images of the user A, the user B, and the user C when the rear camera is used by the terminal to shoot the landscape. The terminal further executes a recognition operation on the captured face images to obtain the contact information list recording contact information of the user A, the user B, and the user C. According to the specific contact information, the terminal executes the preset operation on the captured landscape image, for example, automatically shares the landscape image to the user A, the user B, and the user C.

In the technical solution, preferably, step 204 further includes selecting a portion of contacts from a plurality of contacts in the contact information list according to a received selection command. Step 206 further includes executing the preset operation on the image file according to the information list recording contact information of the portion of contacts.

In the technical solution, the contact information list recognized by the terminal may include a plurality of contacts, and the user can select a portion of contacts from the plurality of contacts to perform an operation. For example, if the terminal recognizes that there are a plurality of contacts, and the user does not want to share the captured image with all the recognized contacts, at this point to share the captured image, the user can select a portion of contacts with who the user wants to share the captured image from all the recognized contacts and share the captured image with the portion of contacts, thereby providing a convenient operation condition for the user and improving usage experience of the user.

In the technical solution, preferably, before step 204, the method further includes setting contact head images and contact information according to a received setting command, and storing the contact head images and the contact information.

In the technical solution, the user can randomly set and select to save the contact head images and the contact information. By doing so, when the terminal executes a recognition operation on the acquired face image, the terminal recognizes the corresponding contact according to the contact head image set by the user, and further finishes the preset operation according to the corresponding contact information. Wherein, the contact information can include a variety of contact information, e.g., a micro blog account, a QQ account. When some contact has a variety of contact information, the terminal can select appropriate contact information from the variety of contact information according to a preset contact information selection rule to execute a preset operation.

In the technical solution, preferably, before step 206, the method further includes prompting the user to make a selection on whether or not a preset operation will be exerted on the image file when the recognition information list is acquired, and further includes receiving user's selection. Step 206 further includes executing the preset operation on the image file when the received selection is yes.

In the technical solution, before executing the preset operation, the terminal prompts the user to make a selection on whether or not the preset operation will be executed, and executes the corresponding operation according to user's selection. By doing so, the user can make a selection according to user's need. For example, after finishing photographing, the user is provided with a prompt for whether or not to select to share the captured image with the recognized photographers.

In the above-described technical solution, preferably, before step 202, the method further includes starting an image file operation function according to a received function starting command, to start the second image acquisition device to acquire the characteristic image when it is detected that the terminal uses the first image acquisition device to acquire an image.

In the technical solution, the user can select whether or not to start the image file processing function according to user's need. By doing so, when the user needs, the user is provided with an image automatic processing function, and when the user does not need, the image file processing function is disabled, which can eliminate unnecessary operation of the terminal and provide the user with excellent usage experience.

Figure 3:
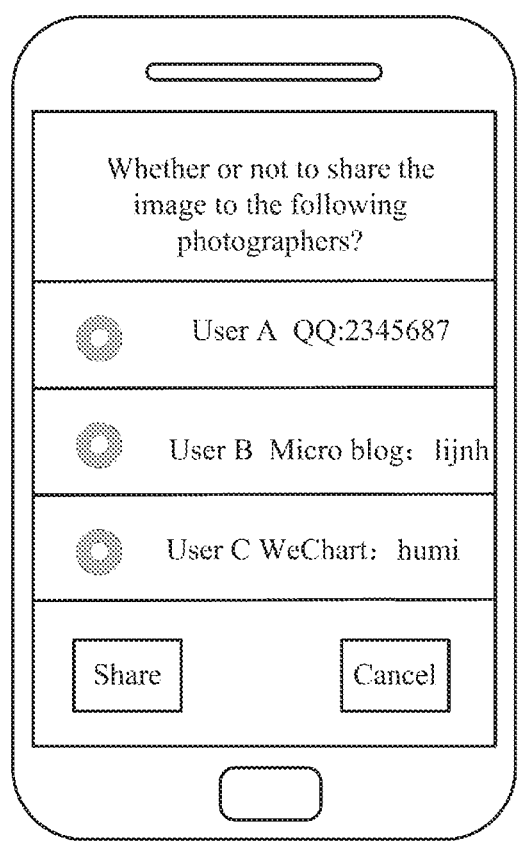
FIG. 3 is a schematic view of an image processing method in accordance with an exemplary embodiment of the present invention.

FIG. 3 shows a schematic view of an image file processing method in accordance with an exemplary embodiment of the present invention.

When the user wants to share the captured image, the user can direct the terminal to start the image file processing function. Thus, the terminal starts the front-facing camera to capture the face image of the photographer when the rear camera is used to capture an image, and accordingly the face image is compared with the pre-stored contact head images so as to recognize at least one photographer in the face image. The contact information corresponding to each photographer is acquired. When the contact information of each photographer is acquired, a prompt is output to prompt the user whether or not to select to share the captured image with each recognized photographer. Also, if the user does not want to share the captured image with all the recognized contacts, the user can select a portion of contacts with who the user wants to share the captured image from the contact information of all the photographers. The terminal will execute the corresponding operation according to user's selection. Certainly, the user can set the terminal to automatically share the captured image according to user's need. That is, when the terminal recognizes the contact corresponding to the recognized photographer, the terminal automatically shares the captured image without outputting a prompt.

As shown in FIG. 3, when the user and his/her friends stand together to use the mobile phone to shoot a landscape, the terminal starts the front-facing camera to capture an image. If it is supposed that the photographers acquired by the front-facing camera includes the user A, the user B, the user C, and the user D, the terminal compares the face images of the user A, the user B, the user C, and the user D with the contact head images, and recognizes that there are contact head images of the user A, the user B, and the user C (that is, there is not the contact head image of the user D), and acquires the contact information of the user A, the user B, and the user C (including account information). At this point, under the condition that the terminal is set by the user to generate a prompt for sharing, the terminal will output a prompt. The user can make a selection according to the prompt. The terminal shares the landscape image captured by the rear camera to the accounts of the contacts selected by the user.

Wherein, the user can randomly set the contact information and the contact information heads. Certainly, the user can add his/her information (that is, owner information) to the contact information list, and add a sharing mode, such as a micro blog sharing mode, a QQ sharing mode, and so on. Thus, when the face image of the owner is acquired, the terminal can recognize the owner and acquire the corresponding shared information so as to share the captured image to the micro blog and QQ according to the shared information. For the example shown in FIG. 3, if the owner has added his/her information to the contact information list and the owner has been recognized as the user A, when the owner selects to share the captured image with the user A, the terminal will share the captured image to the QQ of the owner. If the owner does not select to share the captured image with the user A, the terminal will share the captured image to others selected by the owner, and does not share the captured image to any account of the owner.

Certainly, the user can set the terminal to automatically share the captured image according to user's need. That is, after the contact corresponding to the recognized photographer is recognized, the terminal automatically shares the captured image without outputting a prompt.

Figure 4:
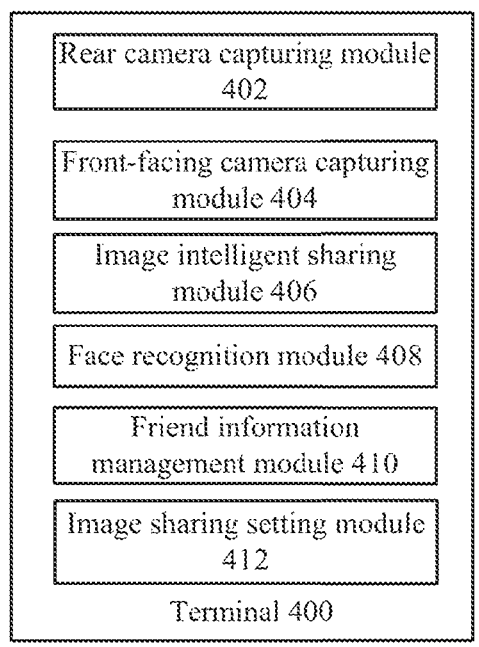
FIG. 4 is a structure diagram of a terminal in accordance with an exemplary embodiment of the present invention.

FIG. 4 shows a structure diagram of a terminal in accordance with an exemplary embodiment of the present invention.

As shown in FIG. 4, a terminal 400 in accordance with an exemplary embodiment of the present invention includes a rear camera capturing module 402, a front-facing camera capturing module 404, an image intelligent sharing module 406, a face recognition module 408, a friend information management module 410, and an image sharing setting module 412. The plurality of modules will be illustrated in detail in combination with FIG. 1.

When the user starts the camera to use the rear camera 402 to capture an image, at this point, the image acquisition unit 102 also starts the front-facing camera capturing module 404 to capture an image.

The function of the information obtaining unit 104 is realized by the image intelligent sharing module 406 transmitting the image captured by the front-facing camera module 404 to the face recognition module 408, and by the face recognition module 408 calling the contact head images provided by the friend information management module 410 and comparing the called contact head images with the heads in the image captured by the front-facing camera 404, so as to acquire a friend list recording friends within the shooting range of the front-facing camera.

The function of the processing unit 106 is realized by the image intelligent sharing module 406 automatically sharing the image captured by the rear camera to friends according to shared information in the friend list.

The function of the setting unit 110 is realized by the image sharing setting module 412 inquiring and setting sharing modes of friends, or by the friend information management module 410 modifying shared information of friends. For example, the user can add himself/herself to the friend information list and add a micro blog sharing mode. Thus, each time when the user uses the terminal to capture an image, the captured image is automatically shared to the micro blog of the user.

The above illustrates the technical solution of the present invention in detail in combination with the accompanying drawings. By means of the technical solution of the present invention, not only the photographed persons can be recognized, but also the photographers can be recognized. Therefore, when the terminal is used to capture an image, the terminal can execute a preset operation on the captured image according to the contact information list recording contact information of the photographers and/or the photographed persons. For example, if a plurality of photographed persons use the terminal to capture an image of a plurality of photographers, after finishing capturing, by means of the technical solution of the present invention, the captured image can be automatically shared to the plurality of photographers and/or the plurality of photographed persons, and the user does not need to select contacts one by one, thereby avoiding complicated operation and facilitating the user to use the terminal.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A terminal comprising:
    an image acquisition unit configured to start a second image acquisition device to acquire a characteristic image of at least one photographer when it is detected that the terminal uses a first image acquisition device to acquire an image;
    an information acquisition unit configured to recognize and process the characteristic image acquired by the second acquisition device so as to acquire a recognition information list;
    a processing unit configured to execute a preset operation on the image file acquired by the first image acquisition device according to the recognition information list.

2. The terminal of claim 1, wherein the characteristic image comprises a face image.

3. The terminal of claim 2, wherein the information acquisition unit comprises a recognition sub-unit configured to compare the acquired face image of the at least one photographer with pre-stored contact head images, so as to recognize the at least one photographer and acquire a pre-stored contact information list corresponding to the at least one photographer; and the processing unit is further configured to execute the preset operation on the image file according to the contact information list.

4. The terminal of claim 3, wherein the terminal further comprises a selecting unit configured to select a portion of contacts from a plurality of contacts in the contact information list according to a received selection command; and the processing unit is further configured to execute the preset operation on the image file according to an information list recording contact information of the portion of contacts.

5. The terminal of claim 3, wherein the terminal further comprises:
    a setting unit configured to set the contact head images and the contact information according to a received setting command; and
    a storing unit configured to store the contact head images and the contact information.

6. The terminal of claim 1, wherein the terminal further comprises a prompting unit configured to prompt the user to make a selection on whether or not the preset operation will be exerted on the image file when the information acquisition unit acquires the recognition information list, and further configured to receive user's selection; and the processing unit is further configured to execute the preset operation on the image file when the selection received by the prompting unit is yes.

7. The terminal of claim 1, wherein the terminal further comprises a function starting unit configured to start an image file operation function according to a received function starting command, to cause the image acquisition unit to start the second image acquisition device to acquire the characteristic image when it is detected that the terminal uses the first image acquisition device to acquire the image.

8. An image file processing method comprising:
    starting a second image acquisition device to acquire a characteristic image of at least one photographer when it is detected that a terminal uses a first image acquisition device to acquire an image;
    recognizing and processing the characteristic image acquired by the second acquisition device so as to acquire a recognition information list;
    executing a preset operation on the image file acquired by the first image acquisition device according to the recognition information list.

9. The image file processing method of claim 8, wherein the characteristic image comprises a face image.

10. The image file processing method of claim 9, wherein the recognizing and processing the characteristic image further comprises comparing the acquired face image of the at least one photographer with pre-stored contact head images so as to recognize the at least one photographer and obtain a pre-stored contact information list corresponding to the at least one photographer; and the executing the preset operation further comprises executing the preset operation on the image file according to the contact information list.

11. The image file processing method of claim 10, wherein the recognizing and processing the characteristic image further comprises selecting a portion of contacts from a plurality of contacts in the contact information list according to a received selection command; and the executing the preset operation further comprises executing the preset operation on the image file according to an information list recording contact information of the portion of contacts.

12. The image file processing method of claim 10, wherein before the recognizing and processing the characteristic image, the method further comprises setting the contact head images and the contact information according to a received setting command, and storing the contact head images and the contact information.

13. The image file processing method of claim 8, wherein before the executing the preset operation, the method further comprises prompting the user to make a selection on whether or not a preset operation will be exerted on the image file when the recognition information list is acquired, and further comprises receiving user's selection; and the executing the preset operation further comprises executing the preset operation on the image file when the received selection is yes.

14. The image file processing method of claim 8, wherein before starting the second image acquisition device, the method further comprises starting an image file operation function according to a received function starting command, to start the second image acquisition device to acquire the characteristic image when it is detected that the terminal uses the first image acquisition device to acquire the image.

15. The terminal of claim 2, wherein the terminal further comprises a function starting unit configured to start an image file operation function according to a received function starting command, to cause the image acquisition unit to start the second image acquisition device to acquire the characteristic image when it is detected that the terminal uses the first image acquisition device to acquire the image.

16. The terminal of claim 3, wherein the terminal further comprises a function starting unit configured to start an image file operation function according to a received function starting command, to cause the image acquisition unit to start the second image acquisition device to acquire the characteristic image when it is detected that the terminal uses the first image acquisition device to acquire the image.

17. The terminal of claim 4, wherein the terminal further comprises a function starting unit configured to start an image file operation function according to a received function starting command, to cause the image acquisition unit to start the second image acquisition device to acquire the characteristic image when it is detected that the terminal uses the first image acquisition device to acquire the image.

18. The image file processing method of claim 9, wherein before starting the second image acquisition device, the method further comprises starting an image file operation function according to a received function starting command, to start the second image acquisition device to acquire the characteristic image when it is detected that the terminal uses the first image acquisition device to acquire the image.

19. The image file processing method of claim 10, wherein before starting the second image acquisition device, the method further comprises starting an image file operation function according to a received function starting command, to start the second image acquisition device to acquire the characteristic image when it is detected that the terminal uses the first image acquisition device to acquire the image.

20. The image file processing method of claim 11, wherein before starting the second image acquisition device, the method further comprises starting an image file operation function according to a received function starting command, to start the second image acquisition device to acquire the characteristic image when it is detected that the terminal uses the first image acquisition device to acquire the image.

* * * * *